United States Patent [19]

Ebinuma et al.

[11] Patent Number: 4,977,459

[45] Date of Patent: Dec. 11, 1990

[54] INK-JET RECORDING APPARATUS WITH MECHANISM FOR AUTOMATICALLY REGULATING A RECORDING HEAD

[75] Inventors: Ryuichi Ebinuma, Kawasaki; Yuji Chiba, Isehara; Nobutoshi Mizusawa, Yamato, all of Japan

[73] Assignee: Canon Kabushiki Kaisha, Tokyo, Japan

[21] Appl. No.: 500,097

[22] Filed: Mar. 21, 1990

Related U.S. Application Data

[63] Continuation of Ser. No. 370,883, Jun. 23, 1989, abandoned.

[30] Foreign Application Priority Data

Jun. 23, 1988 [JP] Japan ................................ 63-153633

[51] Int. Cl.[5] ..................... H04N 1/034; G01D 15/16; B41J 2/05; B41J 2/165

[52] U.S. Cl. ................................ 358/296; 346/140 R; 346/75

[58] Field of Search ............. 346/140 R, 75; 358/296; 400/126

[56] References Cited

U.S. PATENT DOCUMENTS

| | | | |
|---|---|---|---|
| 4,328,504 | 5/1982 | Weber | 346/140 R |
| 4,610,202 | 9/1986 | Ebinuma et al. | 101/364 |
| 4,737,801 | 4/1988 | Ichihashi et al. | 346/140 |

FOREIGN PATENT DOCUMENTS

| | | |
|---|---|---|
| 012821 | 7/1980 | European Pat. Off. . |
| 036787 | 9/1981 | European Pat. Off. . |
| WO8201415 | 4/1982 | Int'l Pat. Institute . |

*Primary Examiner*—Bruce A. Reynolds
*Assistant Examiner*—Scott A. Rogers
*Attorney, Agent, or Firm*—Fitzpatrick, Cella, Harper & Scinto

[57] ABSTRACT

An ink-jet apparatus in which a recorded image is read to provide a image reference signal for comparison with an image recording signal, the resulting comparison being used as a basis for diagnosing an ink injection state of a recording head nozzles in order to determine and implement an ink injection recovery process.

21 Claims, 4 Drawing Sheets

INK-JET RECORDING APPARATUS WITH MECHANISM FOR AUTOMATICALLY REGULATING A RECORDING HEAD

BACKGROUND OF THE INVENTION:

1. Field of the Invention

The present invention relates to an ink-jet recording apparatus comprising an ink-injection recovery processing function.

2. Related Background Art

Since an ink-jet recording apparatus normally employs a liquid recording,, agent, a factor, e.g., bubbles, which makes injection of an ink drop unstable, may be produced in an ink supply system, nozzles, and the like. Since unstable injection of an ink drop leads to low recording quality, the ink-jet recording apparatus comprises a means for eliminating the unstable injection factor (to be referred to as a recovery means hereinafter).

Various unstable injection factors are known, and various recovery means corresponding to such factors are proposed. For example, an optimal operating time or the like of the recovery means depends on the degree of unstable injection.

In particular, in an apparatus comprising a plurality of recovery means or in an apparatus comprising a recovery means consuming an ink, in order to satisfactorily and economically operate the recovery means, it is important to confirm the kind and degree of unstable injection factor based on recording quality.

However, in the conventional ink-jet recording apparatus, a user must confirm the kind and degree of unstable injection factor. Even if the apparatus comprises a plurality of recovery means and thus has a high degree of freedom, it is difficult to flexibly operate these means and to perform optimal recovery processing.

SUMMARY OF THE INVENTION

It is an object of the present invention to solve the conventional problems and to provide an ink-jet recording apparatus which can satisfactorily and economically perform unstable ink injection recovery processing.

In order to achieve the above object, an ink-jet recording apparatus according to the present invention comprises recording means for recording an image on a recording medium, image reader means for reading the recorded image, comparing means for comparing a recording signal input from the recording means and an image signal input from the image reader means, determination means for diagnosing an ink injection state of a recording head nozzle and determining an ink injection recovery processing method on the basis of the comparison result of the comparing means, and processing means for performing the ink injection recovery processing on the basis of the determination result of the determination means.

According to the present invention, the apparatus itself can evaluate the kind and degree of degradation of recording quality, and can perform proper recovery processing. Thus, recovery processing can be satisfactorily and economically performed without wasting an ink.

DETAILED DESCRIPTION OF THE PREFERRED EMBODIMENT

The present invention will now be described in detail with reference to the accompanying drawings.

Figure 1:
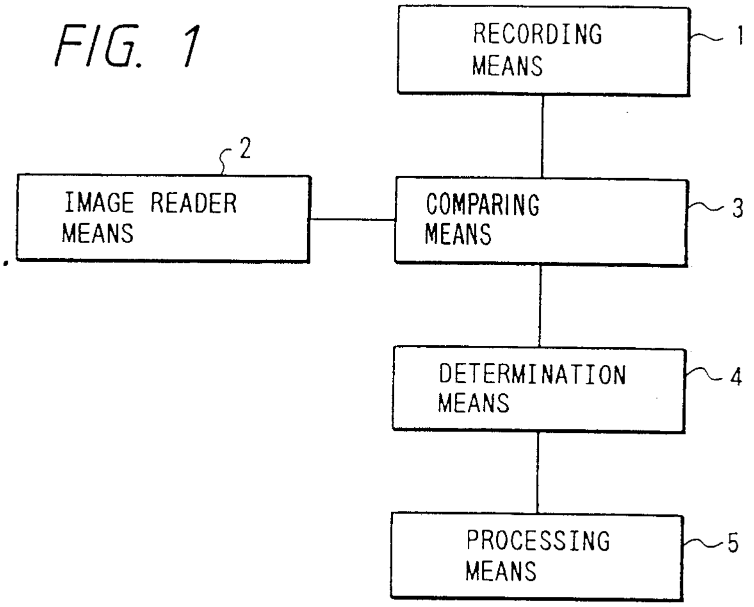
FIG. 1 is a block diagram of an ink-jet recording apparatus according to the present invention.

FIG. 1 is a block diagram of an ink-jet recording apparatus according to the present invention. The ink-jet recording apparatus of the present invention comprises a recording means 1 for recording an image on a recording medium, an image reader means 2 for reading the recorded image, a comparing means 3 for comparing a recording signal input from the recording means 1 and an image signal input from the image reader means 2, a determination means 4 for diagnosing an ink injection state of a recording head nozzle and determining an ink injection recovery processing method on the basis of the comparison result of the comparing means 3, and a processing means 5 for performing the ink injection recovery processing on the basis of the determination result of the determination means 4.

Figure 2:
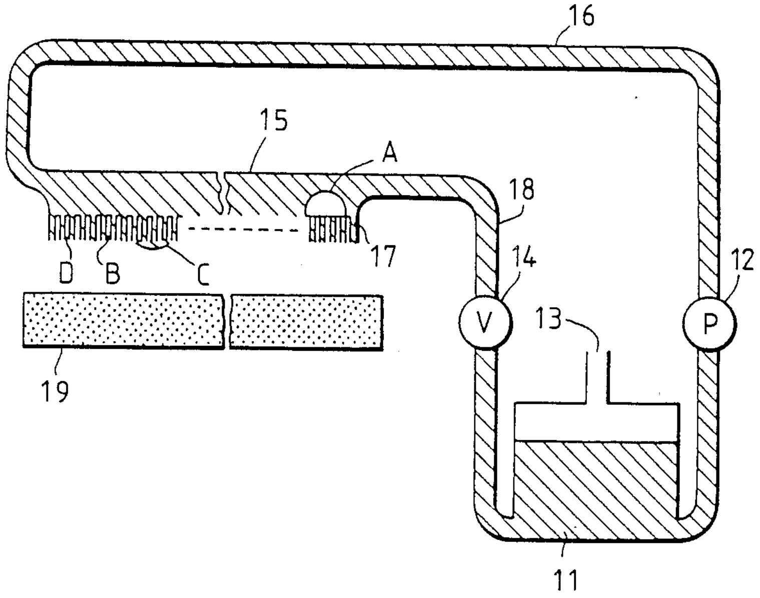
FIG. 2 is a schematic view of an ink supply/recovery system of the ink-jet recording apparatus.

FIG. 2 is a schematic view of an ink supply/recovery system of the ink-jet recording apparatus to which the present invention is applied.

The ink supply/recovery system shown in FIG. 2 includes an ink tank 11 for storing an ink as a liquid recording agent, a pump 12, an ink tank air port 13, a valve 14, a common liquid chamber 15 of a recording head, for supplying an ink to a nozzle 17, a recovery flow path 16, and a supply flow path 18. The operation of the pump 12 and opening/closing control of the valve are controlled by a controller (not shown) for controlling the overall ink-jet recording apparatus.

Upon ink injection, an ink is supplied from the ink tank 11 to the nozzle 17 through the open valve 14, the supply flow path 18, and the common liquid chamber 15 of the recording head. The flow paths form a circulating flow path connected to the ink tank 11 through the recovery flow path 16 and the pump 12. In FIG. 2, reference symbols A to D designate factors influencing injection of an ink drop.

The factor A is a bubble in the common liquid chamber, the factor B is a bubble in the nozzle, the factor C is a leakage at a nozzle opening portion, and the factor D is an increase in ink viscosity caused by a change in composition ratio of an ink due to evaporation of water from the nozzle, opening portion.

When there are these factors destabilizing ink injection, influences on recording quality inherent to these factors are observed.

Figure 3:
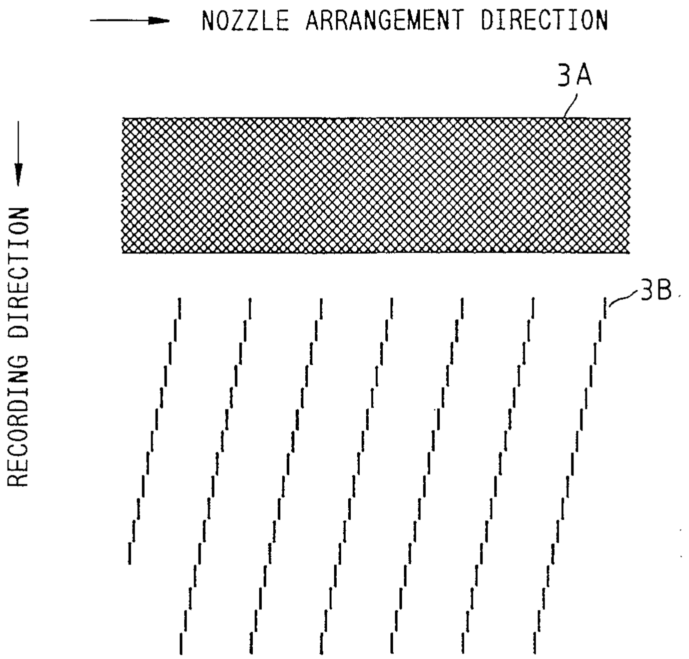
FIG. 3 shows a test pattern for evaluating recording quality.
Figure 4:
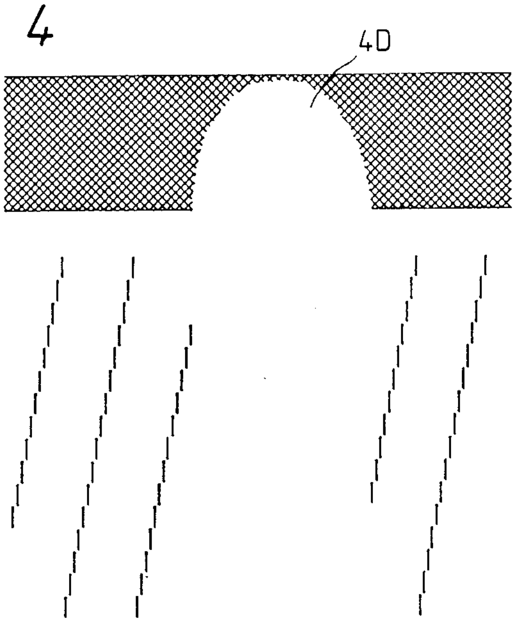
FIGS. 4, 5, and 6 show unstable injection images appearing in the test pattern.
Figure 5:
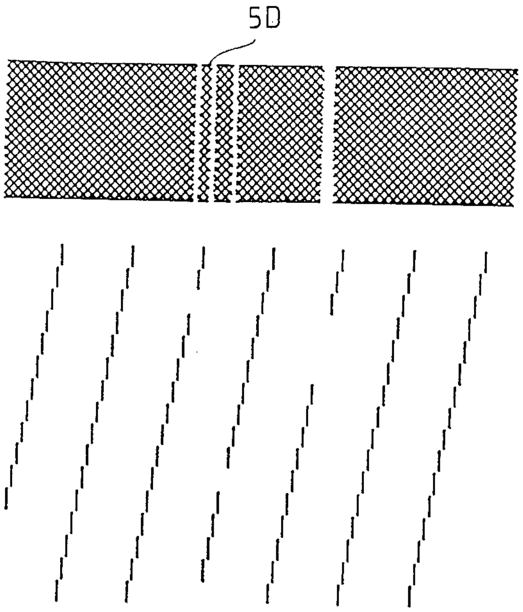
Figure 6:
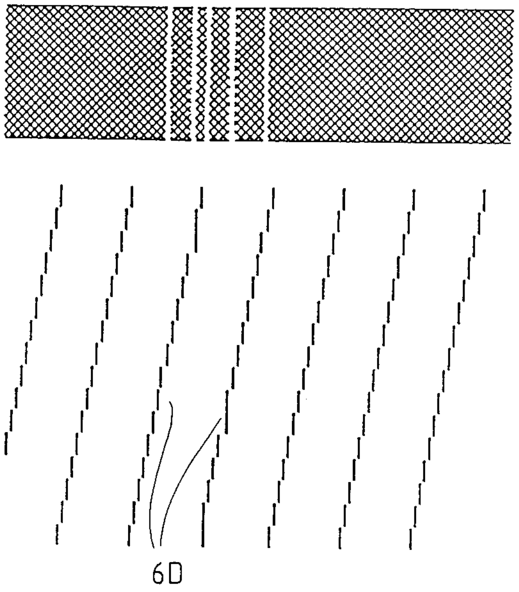

FIG. 3 shows a test pattern for evaluating recording quality. This test pattern includes a band pattern 3A formed by injecting an ink from all the nozzles, and a pattern 3B formed by sequentially injecting an ink from nozzles one by one. If there are the unstable injection factors A to D shown in FIG. 2, the following phenomena appear in this test pattern. FIGS. 4, 5, and 6 show images appearing on the test pattern when there are the unstable injection factors.

(a) Block Omission

As shown in FIG. 4, although an ink can be injected at the beginning, a non-injected portion is formed soon and is expanded to form a large non-injected portion 4D.

Such omission is often caused since a bubble (the factor A in FIG. 2) in the common liquid chamber 15 is moved to the nozzle portion. The size of the bubble influences the size of the non-injected portion 4.

(b) Nozzle Omission

As shown in FIG. 5, there are nozzles which do not inject an ink initially. When non-injected portions 5D are scattered, the factor is often bubbles in the nozzles or a leakage at the nozzle opening portion (the factor B or C in FIG. 2). When the non-injected portions 5D are observed over the entire region of the recording head, the possibility that this is caused by an increase in ink viscosity (the factor D in FIG. 2) is high.

(c) Offset

As designated by symbol 6D in FIG. 6, although an ink is injected, a landing point of an ink drop is offset. In this case, the factor is often a leakage at the nozzle opening portion (the factor C in FIG. 2).

(d) Blurring

Although a phenomenon observed on the test pattern is not shown, a decrease in recording density is caused by a small recorded dot size, a non-injected state and an injected state alternately appear, or the injected state and the non-injected state are mixed. The factor of such blurring is a leakage at the nozzle opening portion (the factor C in FIG. 2) or an increase in ink viscosity (the factor D in FIG. 2). When an image is blurred over the entire recording head region and the blurred image is gradually improved as ink injection continues, the factor is often D.

The relationship between the phenomena (a) to (d) and the unstable injection factors A to D is summarized in Table 1 below.

TABLE 1

| Factor | Phenomenon (a) Block Omission | (b) Nozzle Omission | (c) Offset | (d) Blurring |
|---|---|---|---|---|
| A Bubble in Liquid Chamber | **O** | x | x | x |
| B Bubble in Nozzle | x | **O** | ○ | ○ |
| C Leakage at Opening Portion | x | **O** | **O** | ○ |
| D Increase in Viscosity at Nozzle | x | ○ | x | **O** |

O: strong relation
○: weak relation
x: no relation

As shown in Table 1, when recording quality of the ink-jet recording apparatus is degraded, the unstable injection factor and its degree can be estimated from the state of a recording output. When the apparatus itself comprises an image reader means, it can read its own recording output, and can estimate the unstable injection factor.

As an estimation method, when the resolution of the image reader means is low, a portion corresponding to the pattern 3A in FIG. 3 is read, and its average density is calculated. The calculated average density is compared with a density free from an error to approximately estimate the degree of unstable injection.

In contrast to this, when the resolution of the image reader means is higher than a nozzle arrangement density of the ink-jet recording head, an injection state of each nozzle can be read. The relation between the injection states of adjacent nozzles is examined to estimate the presence/absence and degree of the unstable injection factors A, B, C, and D in FIG. 2.

Figure 7:
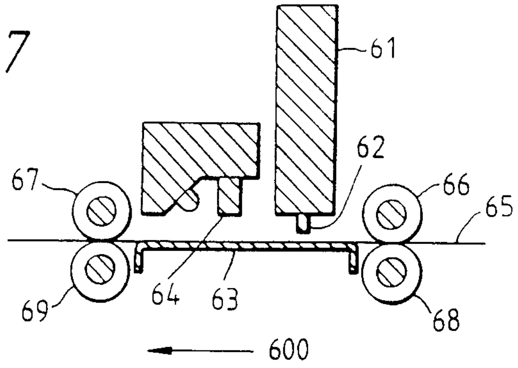
FIG. 7 is a sectional view of a recording section of the ink-jet recording apparatus.

A method of monitoring injection without using a test pattern, as shown in FIG. 7, is also available.

FIG. 7 is a sectional view of a recording section of the ink-jet recording apparatus. The recording section includes a recording head 61, a nozzle 62, a platen 63 which defines a recording surface of a recording medium 65, an image reading line sensor 64 arranged parallel to the recording head 61, and recording medium convey rollers 66 to 69 for conveying the recording medium 65. An arrow 600 indicates the conveying direction of the recording medium 65.

A dot recorded on the recording medium 65 by an ink drop injected from the recording head 61 is immediately read by the image reading sensor 64 corresponding to each nozzle, and ink injection states of the adjacent nozzles are examined. Thus, the ink drop injection state can be monitored without using a test pattern for evaluating recording quality shown in FIG. 3.

In order to remove unstable ink drop injection factors, the supply/recovery system shown in FIG. 2 can perform the following recovery methods.

(1) Circulation

The pump 12 is operated to supply an ink from the ink tank 11 to the common liquid chamber 15 of the recording head through the recovery flow path 16. In this case, the valve 14 is open, and most ink is circulated to the ink tank 11 through the supply flow path 18 and the valve 14. The remaining ink flows out through the nozzle 17.

(2) Compression

The procedures are the same as those in the method (1) except that the valve is closed. All the ink flows out through the nozzle 17.

(3) Wiping

An ink absorbing body 19 is brought into contact with the ink opening portion. When an ink is present in the nozzle, the ink in the nozzle is drawn by a pore in the ink absorbing body 19.

Table 2 below summarizes the relationship between the recovery methods (1) to (3) and the unstable injection factors A to D.

TABLE 2

| Recovery Method | Factor A Bubble in Liquid Chamber | B Bubble in Nozzle | C Leakage at Opening Portion | D Increase in Viscosity at Nozzle |
|---|---|---|---|---|
| (1) Circula- | **O** | ○ | x | ○ |

TABLE 2-continued

| | Factor | | | |
|---|---|---|---|---|
| Recovery Method | A Bubble in Liquid Chamber | B Bubble in Nozzle | C Leakage at Opening Portion | D Increase in Viscosity at Nozzle |
| tion | | | | |
| (2) Compression | Δ | **O** | x | ◎ |
| (3) Wiping | Δ | ○ | ◎ | ○ |

O; large effect
○ ; small effect
Δ; no effect
x; contrary effect

The recovery methods (1) to (3) have parameters of a time, pump pressure, and the like, and the effects shown in Table 2 depend on setting of these parameters. Therefore, the methods (1) to (3) are combined in accordance with the degree of the unstable injection factor, thus performing satisfactory and optimal recovery processing without wasting an ink.

In this embodiment, the apparatus itself combines recovery processing methods, sets parameters based on the estimated unstable injection factors, and displays or executes this setting as optimal recovery processing.

Figure 8:
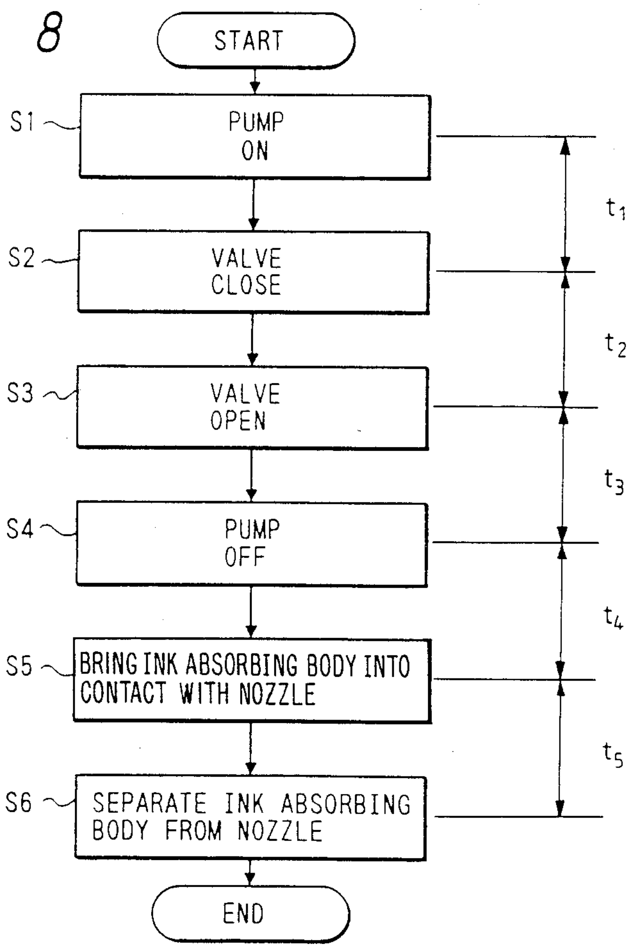
FIG. 8 is a flow chart showing a recovery processing sequence.

For example, the apparatus executes the processing in accordance with the flow chart of the recovery processing sequence shown in FIG. 8. A sequence control program shown in the flow chart of FIG. 8 is stored in a ROM (not shown) constituting the controller.

In step S1, the pump 12 is turned on, and after the lapse of a time $t_1$, the flow advances to step S2.

In step S2, the valve 14 is closed. In this case, the recovery method by means of "compression" is employed. After the lapse of a time $t_2$, the flow advances to step S3.

In step S3, the valve 14 is opened. In this case, the recovery method by means of "circulation" is employed After the lapse of a time $t_3$, the flow advances to step S4.

In step S4, the pump 12 is turned off, and after the lapse of a time $t_4$, the flow advances to step S5.

In step S5, the ink absorbing body 19 is brought into contact with the nozzle 17. In this case, the recovery method by means of "wiping" is employed. After the lapse of a time $t_5$, the flow advances to step S6, and the ink absorbing body is separated from the nozzle to complete "wiping".

In this flow, an operating time $t_o(t_o=t_1+t_2+t_3)$ of the pump is used as a parameter. $t_1+t_3$ is the circulation time shown in Table 2, and $t_2$ is the compression time shown in Table 2. $t_o$ can be considered as a time in which circulation and compression of the recovery methods are executed. The degree of unstable injection is estimated by calculating only a density of a portion corresponding to the pattern 3A in FIG. 3, and the operating time $t_o$ is set in correspondence with the density, thus performing recovery processing.

When recording quality is evaluated in more detail, evaluation factors shown in Tables 1 and 2 are converted to numerical values, and an evaluation function of recovery processing with reference to a wasted ink amount or the like is introduced to perform finer optimal recovery processing.

The self-diagnosis function can be further extended, so that injection states before and after recovery processing are compared besides the unstable injection factors A to D, a non-injected state which is caused by an electrical disconnection and cannot be recovered can be detected, and a need for repair or replacement of a recording head can be determined.

When the recording apparatus has no image reader means, a recorded image can be read by connecting a separate image reading apparatus to this recording apparatus, and its image signal is input to the recording apparatus according to the embodiment of the present invention and is compared with a recording signal input from the recording means to perform self-diagnosis.

As described above, in this embodiment, the apparatus itself can evaluate the kind and degree of degradation of recording quality, and can perform proper recovery processing. Thus, recovery processing can be satisfactorily and economically performed without wasting an ink.

The present invention provides excellent performance particular in the recording head or recording apparatus of a bubble jet type among ink jet recording systems.

Typical structure of this type shown in U.S. Pat. Nos. 4,723,139, and 4,740,796 using an essential principle is desirable for the present invention. In particular, the electro-thermal converter arranged corresponding to a sheet or liquid path containing liquid (ink) generates thermal energy according to a drive signal to quickly increase temperature so that boiling occurs responsive to a recording information. A film boiling occurs at a heating surface of the recording head. As a result, bubbles are formed in a liquid (ink) corresponding to drive signals. In case that the drive signal is a pulse, since suitably the bubbles contract immediately, the liquid (ink) emission of highly excellent response can be achieved desirably. As such drive signal, one disclosed in U.S. Pat. Nos. 4,463,359 and 4,345,262 is suitable. When the condition disclosed in U.S. Pat. No. 4,313,124 is used as a technique to define the temperature increasing ratio at the heating surface, further preferable recording can be obtained.

As a construction of recording head, combination of an orifice, the liquid path, and the electro-thermal converter (linear liquid paths or eight angled liquid paths) and another having a heating unit arranged in a concaved region as disclosed in U.S. Pat. Nos. 4,558,333 and 4,459,600 is within a scope of the present invention. Further, the present invention is effective in the structure disclosed in Japanese Patent Laid-Open No. 59-123670, wherein the orifice of the electro-thermal converter is a common slit of plurality of the electro-thermal converters, and disclosed in Japanese Patent Laid Open No. 59-138461, wherein an opening absorbing thermal energy pressure wave corresponds to the orifice.

Further, as a recording head of a full line type having a length corresponding to a maximum width on which printing is possible on the recording medium, a structure as shown in the above documents wherein the length is filled with plurality of recording heads and a structure of integrally formed single recording head can be used in the present invention to effectively achieve the above described advantage.

Next, it is desirable to add recovery means of the recording head, and preliminary auxiliary means, since the performance of the present invention can be made stable. They are, for example, capping means, cleaning means, pressure and absorbing means, electrothermal converter or another heating element or combination thereof, and preliminary emission means for non-recording emission are desirable. Further, the present invention can be used in a recording apparatus having not only a recording mode for a major color such as black but also at least one of recording modes for a full color such as complex color recorded by different color inks or such as mixed color produced by mixing a plurality of colors.

The above described present invention is summarized as follows. The present invention is characterized in that when a term during which continuous printing is not conducted is longer than a predetermined time, when continuous recording information inputted into a predetermined liquid emission unit or predetermined plurality of divided groups of unit is not greater than a predetermined number, or when recording during an initial term after turning on the main switch is conducted, recording is conducted according to a drive signal of a quantity of energy greater than that of the drive signal for stable printing.

In other words, recording modes for actual recording on the basis of the above standard includes initial recording mode for recording according to a drive signal with relatively increased energy quantity and intermediate recording mode following to the initial recording mode. The intermediate recording mode is conducted by a relatively smaller quantity of energy.

In the above embodiment, the recording information is supplied to the recording head. A plurality of electrothermal converters of the recording head are divided into plurality of groups. For each group, on the basis of existence and nonexistence or-number of the recording information signals, the term during which the signal is not supplied is determined. Usage of the embodiment for each group is desirable.

The above described increasing of energy step by step is explained as follows. Table 3 shows as an example, a discrimination means having three determination means of n-control number.·An example 1 is to increase applying pulse width reduction according to reducing control number n. An example 2 is to equalize the pulse width reduction, when no (maximum of n) is 20, three stages are used. When no is 40, two stages are used.

TABLE 3

| n | Pulse Width (Example 1) | Pulse Width (Example 2) |
|---|---|---|
| 200 | y × 1.1 | y × 1.05 |
| 51 | | |
| 50 | y × 1.08 | y × 1.03 |
| 21 | | |
| 20 | y × 1.04 | y × 1.01 |
| 1 | | |

y: Pulse width of standard drive signal preliminary determined for each apparatus in order to conduct stabilized printing.

As described in the above, since the quantity of energy is modified step by step according to the term during which the recording signal is not supplied and to a number of pulse, the recording density is homogenized. 9A is also desirable to change continuously the quantity of energy according to variable, control number n. In particular, on the basis of a ratio to the maximum value no, the pulse width corresponding to increasing energy is reduced according to a reduction of n. With regard to a function of control, when the correction factor of the pulse width relative to the standard pulse width $y_0$ is 1.1, ($y_0 \times 1.1 \times (n/no)$) is used as a pulse width for five control, or natural number $y_0 \times (1.1-(n/5) \times 0.01)$ with gauss symbol is used as a pulse width for five control. Since the longer term for increasing the energy of applied pulse is not desirable, it is preferable to provide limitter means of one fourth or fifth of the line printing length (maximum) to obtain stopper effect as a erroneous control operation preventing mechanism.

In any case, since the present invention increases the quantity of energy of drive signal at the initial drive forcedly to obtain greater diameter of recording dot according to the variable with regard to time, such as drive signal pulse number or the result of the operation of predetermined standard discrimination means, uneven density of recorded image is compensated. Accordingly, high quality of recording image can be obtained.

We claim:

1. An ink-jet recording apparatus comprising:
recording means for recording an image on a recording medium;
image reader means for reading the image;
comparing means for comparing a recording signal input from said recording means and an image signal input from said image reader means;
determination means for diagnosing an ink injection state of a recording head nozzle and determining an ink injection recovery processing method on the basis of the comparison result of said comparing means; and
processing means for performing ink injection recovery processing based on the determination result of said determination means.

2. An apparatus according to claim 1, wherein said determination means comprises a display unit for displaying the ink injection recovery processing method determined by said determination means.

3. An apparatus according to claim 1, wherein when block omission is observed based on the comparison result, said determination means determines that a bubble is produced in a common liquid chamber of the nozzle, and selects circulation of ink to the common liquid chamber as the recovery processing method.

4. An apparatus according to claim 1, wherein when nozzle omission is observed based on the comparison result, said determination means determines that a bubble is present in the nozzle or that leakage is occurring at a nozzle opening portion, and selects compression of an ink pressure or wiping of the nozzle opening portion with an ink absorbing body as the recovery processing method.

5. An apparatus according to claim 1, wherein when offset is observed by said comparing means, said determination means determines that leakage is occurring at a nozzle opening portion, and selects wiping of the nozzle opening portion with an ink absorbing body as the recovery processing method.

6. An apparatus according to claim 1, wherein when blurring is observed by said comparing means, said determination means determines that an ink viscosity at the nozzle is increased, and selects compression of an ink pressure as the recovery processing method.

7. An ink-jet recording apparatus for recording on a recording medium with a recording head for emitting ink, the apparatus comprising:

signal providing means for providing said recording head with a predetermined recording signal;

a reading mechanism for reading an image recorded on the recording medium by said recording head according to the predetermined recording signal and providing an image signal representative of the image;

a control mechanism for conducting a plurality of different recovery processes on said recording head; and an automatic regulation mechanism for determining the recovery process conducted on said recording head by said control mechanism on the basis of the image signal and the predetermined recording signal.

8. An apparatus according to claim 7, wherein said reading mechanism has a higher resolution than a recording density or orifice density of said recording head.

9. An apparatus according to claim 7, wherein said reading mechanism provides as the image signal a signal representing an average density of the image and said regulation mechanism determines the recovery process on the basis of the average density.

10. An apparatus according to claim 7, wherein said reading mechanism has an optical reading means for reading a line of the image.

11. An apparatus according to claim 7, wherein the plurality of recovery processes includes a circulation recovery process for directing ink through said recording head and a discharge recovery for discharging ink in said recording head from a discharge orifice.

12. An apparatus according to claim 11, wherein the plurality of recovery processes includes cleaning said orifice of said recording head.

13. An apparatus according to any one of claims 7–12 , wherein said control mechanism includes means for automatically conducting the recovery process determined by said regulation mechanism.

14. An apparatus according to claim 7, wherein said control mechanism performs a circulation recovery process for directing ink through a common liquid chamber connected to a plurality of orifices of said recording head when the image signal indicates a block omission in the image, performs a cleaning recovery for cleaning said orifices when the image signal indicates an offset in the image, and performs a discharge recovery process for discharging ink from said orifices when the image signal indicates a blurring in the image.

15. An apparatus according to claim 7, wherein said recording head has an electro-thermal transducer for producing a bubble in the ink using thermal energy.

16. An ink-jet recording apparatus for recording on a recording medium with a recording head having an electro-thermal transducer element for emitting ink, the apparatus comprising:

signal providing means for providing said recording head with a predetermined recording signal;

a reading mechanism for reading an image recorded on the recording medium by said recording head according to the predetermined recording signal and providing an image signal representative of the image, said reading mechanism including a reading sensor having a higher resolution than a recording density or orifice density of said recording head; and means for automatically regulating said recording head by automatically determining a recovery process to which said recording head is subjected on the basis of the image signal and the predetermined recording signal.

17. An apparatus according to claim 16, wherein said reading sensor is a line sensor.

18. An apparatus according to claim 16, wherein said recording head is a full-line type and said reading mechanism is disposed downstream of said recording head along a recording medium conveying path.

19. An ink-jet recording apparatus for recording on a recording medium with a recording head having an electro-thermal transducer element for emitting ink, the apparatus comprising:

signal providing means for providing said recording head with a predetermined recording signal;

a reading mechanism for reading the average density of an image recorded on the recording mechanism by said recording head according to the recording signal and providing an image signal representative of the image; and means for automatically regulating said recording head by automatically determining a recovery process to which said recording head is subjected on the basis of the image signal and the predetermined recording signal.

20. An apparatus according to claim 19, wherein said recording head is a full-line type and said reading mechanism is downstream from said recording head along a recording medium conveying path.

21. An ink jet recording apparatus for recording on a recording medium with a recording head for emitting ink, the apparatus comprising:

signal providing means for providing said recording head with a predetermined recording signal;

a reading mechanism for reading an image recorded on the recording medium by said recording head according to the recording signal and providing an image signal representative of the image; and means for performing a recovery process on said recording head on the basis of the image signal and the predetermined recording signal, wherein said reading means is disposed for reading an image recorded on the recording medium by said recording head according to the predetermined recording signal after the recovery process is performed to determine if said recording head requires repair or replacement.

* * * * *

UNITED STATES PATENT AND TRADEMARK OFFICE
CERTIFICATE OF CORRECTION

PATENT NO. : 4,977,459

DATED : December 11, 1990

INVENTOR(S) : RYUICHI EBINUMA ET AL.

It is certified that error appears in the above-identified patent and that said Letters Patent is hereby corrected as shown below:

AT [57] ABSTRACT

Line 2, "a" should read --an--.

Line 5, "nozzles" should read --nozzle--.

COLUMN 1

Line 13, "recording,," should read --recording--.

Line 35, "means" should read --means,--.

COLUMN 2

Line 41, "valve" should read --valve 14--.

Line 43, "an ink" should read --ink--.

Line 56, "nozzle," should read --nozzle--.

COLUMN 5

Line 41, "ployed After" should read --ployed. After--.

COLUMN 6

Line 20, "particular" should read --particularly--.

Line 24, "4,723,139," should read --4,723,129--.

Line 44, "eight angled" should read --right-angled--.

Line 46, "caved" should read --cave--.

UNITED STATES PATENT AND TRADEMARK OFFICE

CERTIFICATE OF CORRECTION

PATENT NO. : 4,977,459

DATED : December 11, 1990

INVENTOR(S) : RYUICHI EBINUMA ET AL. Page 2 of 3

It is certified that error appears in the above-identified patent and that said Letters Patent is hereby corrected as shown below:

COLUMN 7

Line 16, "of unit" should read --of units--.

Line 23, "includes" should read --include--.

Line 26, "following to" should read --following--.

Line 33, "or-number" should read --or number--.

Table 3, " n / 200 should read -- n / 200

| " n | should read -- n |
|---|---|
| 200 | 200 |
| | ~ |
| 51 | 51 |
| 50 | 50 |
| | ~ |
| 21 | 21 |
| 20 | 20 |
| | ~ |
| 1" | 1--. |

Line 63, "9A" should read --It--.

COLUMN 8

Line 45, "ink" should read --an ink--.

UNITED STATES PATENT AND TRADEMARK OFFICE

CERTIFICATE OF CORRECTION

PATENT NO. : 4,977,459

DATED : December 11, 1990

INVENTOR(S) : RYUICHI EBINUMA ET AL.

It is certified that error appears in the above-identified patent and that said Letters Patent is hereby corrected as shown below:

COLUMN 9

Line 31, "discharge recovery" should read --discharge recovery process--.

Signed and Sealed this

Twelfth Day of January, 1993

Attest:

DOUGLAS B. COMER

Attesting Officer

*Acting Commissioner of Patents and Trademarks*